(12) United States Patent
Han et al.

(10) Patent No.: US 6,442,308 B1
(45) Date of Patent: Aug. 27, 2002

(54) OPTICAL WAVELENGTH MULTIPLEXER/ DEMULTIPLEXER WITH UNIFORM LOSS

(76) Inventors: Dong-Kyoon Han, Samboo Apt. #7-13, Youido-dong, Yongdungpo-gu, Seoul; Hyoun-Soo Kim, Jinheung Apt. #801-1002, Imae-dong, Puntang-gu, Songnam-shi, Kyonggi-do, both of (KR)

(*) Notice: Subject to any disclaimer, the term of this patent is extended or adjusted under 35 U.S.C. 154(b) by 0 days.

(21) Appl. No.: 09/411,931

(22) Filed: Oct. 4, 1999

(30) Foreign Application Priority Data

Feb. 1, 1999 (KR) ............................................. 99-3219

(51) Int. Cl.$^7$ ................................................. G02B 6/28
(52) U.S. Cl. ............................. 385/24; 385/37; 385/28; 385/46
(58) Field of Search .............................. 385/24, 27–30, 385/46, 31, 32, 37, 122; 372/21, 22, 45; 359/115, 116, 124, 127

(56) References Cited

U.S. PATENT DOCUMENTS

| | | | | |
|---|---|---|---|---|
| 5,574,818 A | * | 11/1996 | Krivoshlykov | 385/122 |
| 5,706,377 A | | 1/1998 | Li | 385/37 |
| 5,889,906 A | * | 3/1999 | Chen | 385/28 |
| 6,181,721 B1 | * | 1/2001 | Geels et al. | 372/45 |
| 6,195,482 B1 | * | 2/2001 | Dragone | 385/28 |

FOREIGN PATENT DOCUMENTS

EP      1059545 A1    12/2000

OTHER PUBLICATIONS

J.C. Chen; et al. "Waveguide grating routers with greater channel uniformity"; Electronics Letters, Nov. 6, 1997; vol. 33, No. 23; pp. 1951–1952.

* cited by examiner

Primary Examiner—Frank G. Font
Assistant Examiner—Michael P. Mooney
(74) Attorney, Agent, or Firm—Steve Cha; Klauber & Jackson

(57) ABSTRACT

Disclosed is an optical wavelength multiplexer/demultiplexer with uniform loss. The optical wavelength multiplexer/demultiplexer includes a first star coupler for dividing optical power of input optical signals received from input optical waveguides, an arrayed waveguide grating for guiding the optical signals outputted from the first star coupler therethrough in such a fashion that the optical signals have different phases, respectively, a second star coupler for coupling or dividing the wavelengths of the optical signals outputted from the arrayed waveguide grating, and outputting the resultant optical signals to output waveguides, respectively, and a waveguide mode controller for controlling the profile of a waveguide mode of the optical signals outputted from the arrayed waveguide grating, thereby allowing the optical signals focused at an output terminal of the second star coupler to have flat amplitude distributions. The waveguide mode controller maintains the main peak of the output waveguide mode while phase-shifting tails of the output waveguide mode. By virtue of the mode controller, it is possible to form a diffraction pattern with flat amplitude distribution. Accordingly, an uniformity of loss among channels is obtained.

4 Claims, 6 Drawing Sheets

OPTICAL WAVELENGTH MULTIPLEXER/ DEMULTIPLEXER WITH UNIFORM LOSS

CLAIM OF PRIORITY

This application makes reference to, incorporates the same herein, and claims all benefits accruing under 35 U.S.C. §119 arising from an application entitled, "Optical Wavelength Multiplexer/Demultiplexer with Uniform Loss" earlier filed in the Korean Industrial Property Office on Feb. 1, 1999 and there duly assigned Ser. No. 1998-3219.

BACKGROUND OF THE INVENTION

1. Field of the Invention

The present invention relates to an optical wavelength multiplexer/demultiplexer, and more particularly to an optical wavelength multiplexer/demultiplexer capable of suppressing a non-uniform loss between channels.

2. Description of the Related Art

The operation of an optical wavelength multiplexer/demultiplexer using an arrayed waveguide grating (AWG) can be defined by a grating equation describing dispersion characteristics of incident light resulting from a diffraction of the incident light under the condition in which an array of waveguides is regarded as a diffraction grating. Such an optical wavelength multiplexer/ demultiplexer is referred to as an AWG optical wavelength demultiplexer. Light incident to such an AWG optical wavelength demultiplexer varies in phase while passing through three parts of the AWG optical wavelength demultiplexer, that is, a first star coupler, an AWG, and a second star coupler. The phase variations of light respectively generated by the parts of the AWG optical wavelength demultiplexer are summed at a final output plane, namely, an interface between the AWG and the second star coupler, so that a reinforced interference effect is obtained at the final output plane. The above mentioned grating equation is an equation for deriving a condition in which a reinforced interference effect is obtained at the final output plane by virtue of the sum of the phase variations. Assuming that light is incident to a central to one of a plurality of input waveguides, the above mentioned grating equation is expressed as follow:

$$n_s d \sin \theta + n_c \Delta L = m\lambda \quad \text{[Expression 1]}$$

wherein "$n_s$" represents effective refractive index of the star couplers, "$n_c$" represents an effective refractive index of the channel waveguides AWG, "d" represents the pitch of the AWG, "m" represents the order of diffraction, "$\Delta L$" represents a length difference between adjacent waveguides in the AWG, and "$\lambda$" represents the wavelength of incident light, respectively.

The central operating waivelength $\lambda_0$ corresponds to the wavelength of light when "$\theta$," in Expression 1, corresponds to zero. This central operating wavelength $\lambda_0$ is defined as follows:

$$\lambda_0 = \frac{n_c \Delta L}{m} \quad \text{[Expression 2]}$$

From Expression 1, it is possible to derive an equation of a variation in the diffraction angle of light depending on the variation in wavelength. This equation can be expressed as follows:

$$\frac{d\theta}{d\lambda} = \frac{m}{n_s d} \quad \text{[Expession 3]}$$

As the wavelength of the incident light varies, as expressed in Expression 3, a variation in the wavefront direction of the light occurs. Such a variation in the wavefront direction of the light results in a variation in the main peak position of an interference pattern formed on the image plane of the second star coupler. That is, an interference pattern is formed at a position shifted in accordance with a variation in the wavelength of light wave. Accordingly, when an output waveguide is placed at the position where light of a desired wavelength is focused, a wavelength multiplexing/demultiplexing function can be conducted.

In the case of the above-mentioned AWG optical wavelength demultiplexer, however, a non-uniformity loss ranging from 2.5 dB to 3 dB is exhibited due to different diffraction efficiencies. In the case of an optical communication network having a large number of nodes, such non-uniformity of loss is accumulated as optical signals pass through each device, as mentioned above, so that its effect is amplified. This may serve as a severe limitation in configuring a desired system. In practice, one conventional method used to obtain uniform loss between the output channels is to use about a half of the total number of available output waveguides that can be coupled to the second slab waveguide. This can be realized by expanding the free spectral range (FSR) of the device by doubling the wavelength range to be used. Using this method, it is possible to reduce the non-uniformity loss within a range of 0.5 to 1 dB. However, this method reduces the number of devices that can be placed on a single wafer due to an increased size of the devices.

Meanwhile, the uniform gain uniformity can be improved by applying a plurality of AWG optical wavelength demultiplexers to compensate the waveguides with different losses. However, the above mentioned method requires many AWG optical wavelength demultiplexers to be cascaded in series, therefore, the loss non-uniformity of each device still remains.

In order to achieve an improvement in device, another method has been proposed by J. C. CHEN, et al ("WAVEGUIDE GRATING ROUTERS WITH GREATER CHANNEL UNIFORMITY", Electronics Letters, 1997, vol. 33., no. 23, pp. 1951~1952). This method teaches an insertion of additional waveguides between adjacent waveguides in an AWG, as shown in FIG. 1.

SUMMARY OF THE INVENTION

The object of the invention is to provide an AWG optical wavelength emultiplexer of the type having a waveguide mode controller arranged between the AWG thereof and the second star coupler thereof, so that the second star coupler can form a flat diffraction pattern to obtain a uniformity of loss.

In accordance with the present invention, this object is accomplished by providing an optical wavelength multiplexer/demultiplexer for coupling or dividing optical signals of different wavelengths received from one or a plurality of input optical waveguides, and outputting the coupled or divided optical signals to one or a plurality of output optical waveguides, respectively, comprising: a first star coupler for dividing powers of the input optical signals received from the input optical waveguides; an arrayed waveguide grating for guiding the optical signals outputted from the first star coupler therethrough in such a fashion that the optical signals have a constant phase difference relative to the neighboring waveguides; a second star coupler for coupling or dividing the wavelengths of the optical signals outputted from the arrayed waveguide grating, and outputting the resultant optical signals to the output waveguides, respectively; and waveguide mode control means for controlling the profile of a waveguide mode of the optical signals outputted from the arrayed waveguide grating, thereby allowing the optical signals diffracted from each waveguide of the AWG have flat amplitude distributions at the image plane of the second star coupler.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Preferred embodiments of the present invention will be described in detail with reference to the attached drawings. It is to be noted that a detailed description of a known function or structure of the present invention will be omitted if it is deemed to obscure the subject matter of the present invention.

Figure 1:
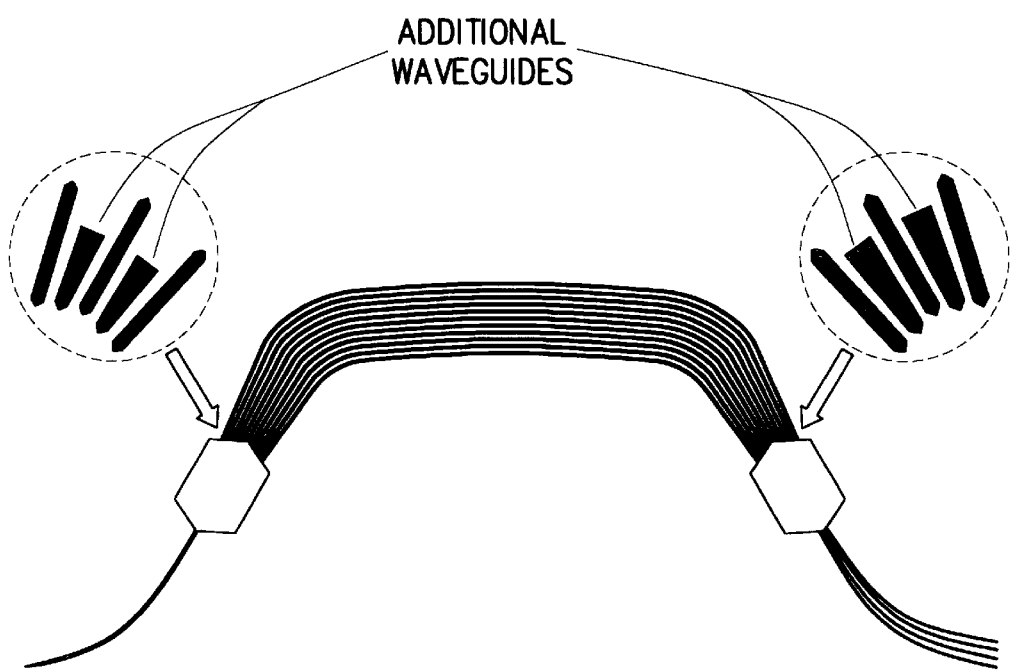
FIG. 1 is a schematic view illustrating a conventional AWG optical wavelength multiplexer/demultiplexer with uniform loss.
Figure 2:
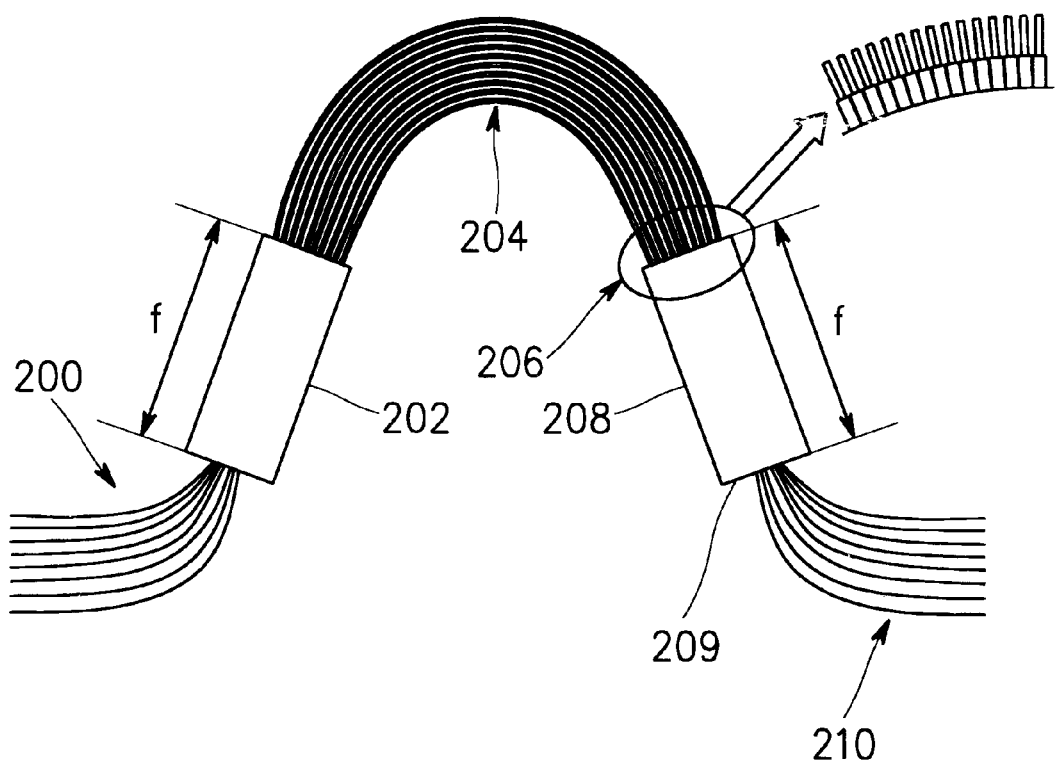
FIG. 2 is a schematic view illustrating an AWG optical wavelength multiplexer/demultiplexer with uniform loss in accordance with the present invention.

FIG. 2 is a schematic view illustrating the configuration of an AWG optical wavelength demultiplexer with uniform loss in accordance with the present invention. As shown in FIG. 2, the AWG optical wavelength demultiplexer includes a plurality of input waveguides 200, a first star coupler 202 coupled to the output terminals of the input waveguides 200, a plurality of AWGs 204 coupled to the output terminal of the first star coupler 202, a plurality of waveguide mode controller 206 adapted to control the waveguide mode profile of optical signals outputted from the AWG 204, a second star coupler 208 coupled to the output of the waveguide mode controller 206, and a plurality of output waveguides 210 coupled to the output of the second coupler 208. In FIG. 2, the reference numeral 209 denotes a focal plane of the second star coupler 208.

The operation of the AWG optical wavelength demultiplexer having the above mentioned configuration will now be described. Optical signals outputted from the input waveguide 200 pass through the first star coupler 202, and then enter the AWG 204 having a plurality of arrayed optical waveguides. The optical signals travel at different phases while passing through the AWG 204. The optical signals arriving at different phases are then incident to the second star coupler 208 in which a reinforcement and interference occurs. As a result, the optical signals are focused at one of the output waveguide 210 in a self-imaging fashion. The resultant focused image that each waveguide captures is then outputted from each of the output waveguide 210.

A plurality of waveguide mode controllers 206 maintains the main peak of the waveguide mode of the optical signals outputted from the AWG 204, while phase-shifting tails of the waveguide mode. The resultant optical signals from the waveguide mode controller 206 are then applied to the second star coupler 208.

AWG optical wavelength demultiplexer is implemented by an arrayed waveguide grating configured to vary its wavefront direction depending on a variation in the wavelength of light. In this AWG optical wavelength demultiplexer, a linear dispersion indicative of a variation in the shift of the main peak of an interference pattern on a focal plane 209 depending on the variation in wavelength can be expressed as follows:

$$\frac{dx}{d\lambda} = \frac{fm}{n_s d} \quad \text{[Expression 4]}$$

wherein, "f" represents the focal distance of the star coupler, "m" represents the order of diffraction, "d" represents the pitch of an AWG, and "$n_s$" represents the effective refractive index of the star coupler, respectively.

In accordance with Expression 4, the wavelength distribution of optical signals is spatially mapped on the focal plane 209 of the second star coupler 208. Accordingly, where a plurality of output waveguides are coupled to the focal plane 209, while being uniformly spaced apart from one another by a predetermined distance, it is possible to implement an AWG optical wavelength demultiplexer having a desired uniform wavelength spacing.

Figure 3:
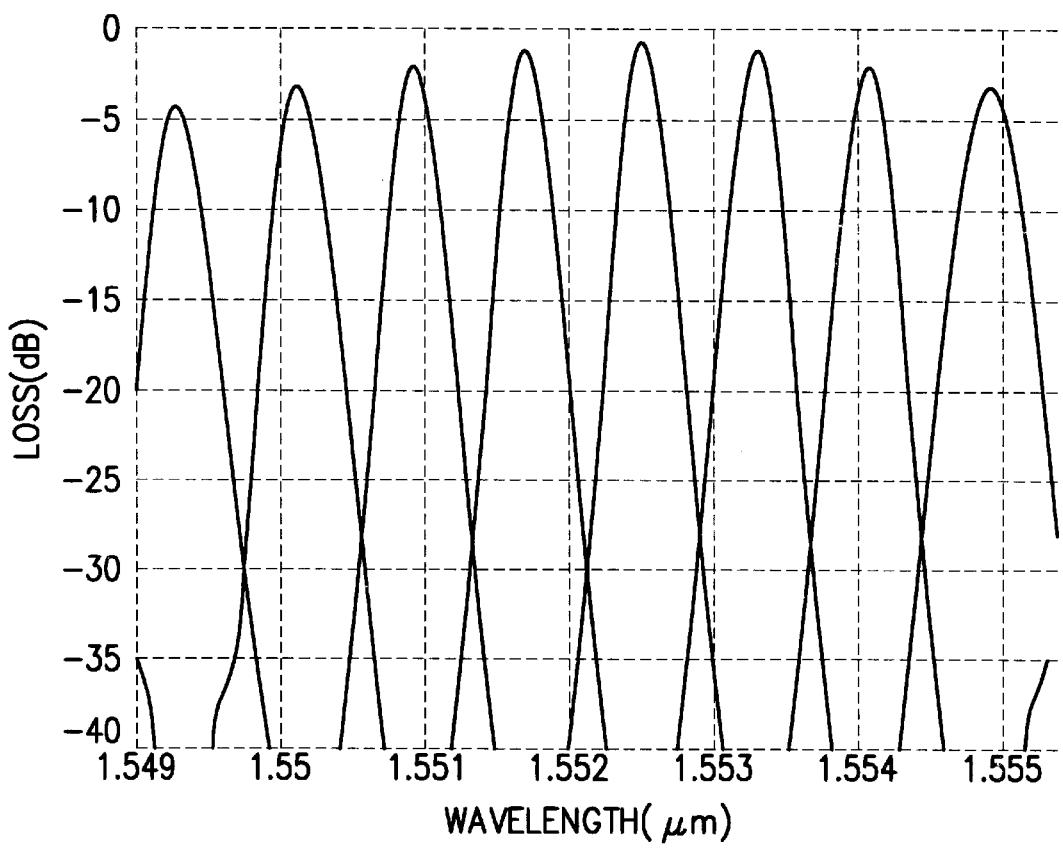
FIG. 3 is a graph depicting output characteristics of the conventional AWG optical wavelength demultiplexer exhibiting a non-uniformity of loss.

The loss in such an AWG optical wavelength demultiplexer is minimized at the center channel while being gradually increased in a direction away from the center channel. This is because each waveguide mode of the AWG 204 coupled to the second star coupler 208 has a Gaussian profile, and thus the focused image on the focal plane 209 also has a Gaussian distribution. That is, the non-uniformity loss curve of FIG. 3, which is formed by connecting loss at all channels to one another, has a direct relation with the diffraction or interference pattern formed on the focal plane 209.

In order to obtain a uniformity of loss of the channels, accordingly, it is necessary to form a flat diffraction pattern on the focal plane 209. For an ideal case in which a rectangular diffraction pattern is formed, the output waveguide mode of the AWG 204 should have the form of a sinc function. This will be described in detail hereinafter.

The optical signals outputted from the AWG 204 form an interference pattern on the focal plane 209, that is, the interface between the output terminal of the second star coupler 208 and the output waveguides 210 by virtue of a Fraunhofer diffraction. The Fraunhofer diffraction describes the relation between the input optical signals and the diffraction pattern in the form of a Fourier transform. Accordingly, if only one of the input optical signal or the diffraction pattern is known, it is then possible to calculate the other remaining one using a Fourier transform or an inverse Fourier transform. For an ideal case, the diffraction pattern formed on the focal plane 209 should be flat, assuming that the optical field amplitude of individual waveguide at the input plane has the profile of a sinc function.

However, it is impractical to set a wavelength mode having the form of a sinc function. In order to form a flat diffraction pattern, therefore, the waveguide mode controller 206 is interposed between the AWG 204 and the second star coupler 208 in accordance with the present invention. The waveguide mode controller 206 maintains the main peak of each waveguide mode while phase-shifting tails of the waveguide mode. For the waveguide mode controller 206, a multi-mode interferometer may be appropriately used.

Figure 4:
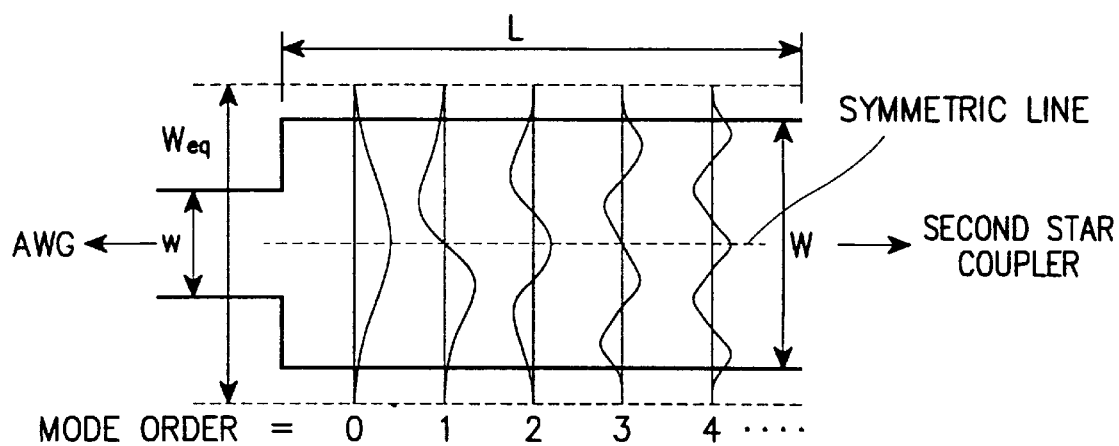
FIG. 4 is a schematic view illustrating the structure of a multi-mode interferometer according to the present invention.

FIG. 4 illustrates a structure of the multi-mode interferometer. In FIG. 4, "w" represents the width of each waveguide in the AWG 204, "W" represents the width of the multi-mode interferometer, and "L" represents the length of the multi-mode interferometer. The operation of the multi-mode interferometer is determined in accordance with the above mentioned parameters as well as the position of the input waveguides. The operation of the multi-mode interferometer is also determined, depending on different eigenmodes in the multi-mode interferometer. The characteristic dimension of the multi-mode interferometer is defined by the following Expression 5:

$$L_c = \frac{\pi}{\beta_0 - \beta_1} = \frac{4}{3} n \frac{W_{eq}^2}{\lambda} \qquad \text{[Expression 5]}$$

In Expression 5, "$L_c$" represents a coupling length, "n" a refractive index, and "$\beta_0$" and "$\beta_1$" respective propagation constants of the first two of the modes in the multi-mode interferometer, respectively. "$W_{eq}$" represents a width including not only the actual width of the multi-mode interferometer, but also the tails of each waveguide mode. In a strongly guiding structure exhibiting a large refractive index difference of waveguides, "$W_{eq}$" corresponds to the actual width W of the multi-mode interferometer.

The waveguide mode entering the multi-mode interferometer repetitively reconstructs its mode profile while passing through the multi-mode interferometer. That is, the waveguide mode exhibits a self-imaging effect. By virtue of such a self-imaging effect, it is possible to make a multi-mode interference, in which the waveguide mode is reconstructed into an original profile at its main peak portion while being shifted in phase at its tails. The travel distance L of the input waveguide mode in the multi-mode interferometer can be expressed as follows:

$$L = \frac{M}{N} \cdot \frac{3L_0}{a} \cong \frac{M}{N} \cdot \frac{4n}{a} \cdot \frac{W^2}{\lambda} \qquad \text{[Expression 6]}$$

In Expression 6, "N" represents the number of reconstructed images, "M" represents the number of image reconstruction times, and "a" represents a parameter for determining the kind of the multi-mode interferometer. In the case of a multi-mode interferometer having a symmetrical arrangement, if input waveguides are arranged at a position corresponding to W/2, then a=4. In the case of a 2×N multi-mode interferometer, input waveguides should be arranged at positions corresponding to W/3 and 2W/3, respectively. In the latter case, the value of "a" corresponds to 3.

The multi-mode interferometer used in the present invention has a 1×1 symmetrical arrangement. This multi-mode interferometer has characteristics determined by the following Expression:

$$L = M \cdot \frac{3L_0}{4} \cong nM \frac{W^2}{\lambda} \qquad \text{[Expression 7]}$$

Figure 5:
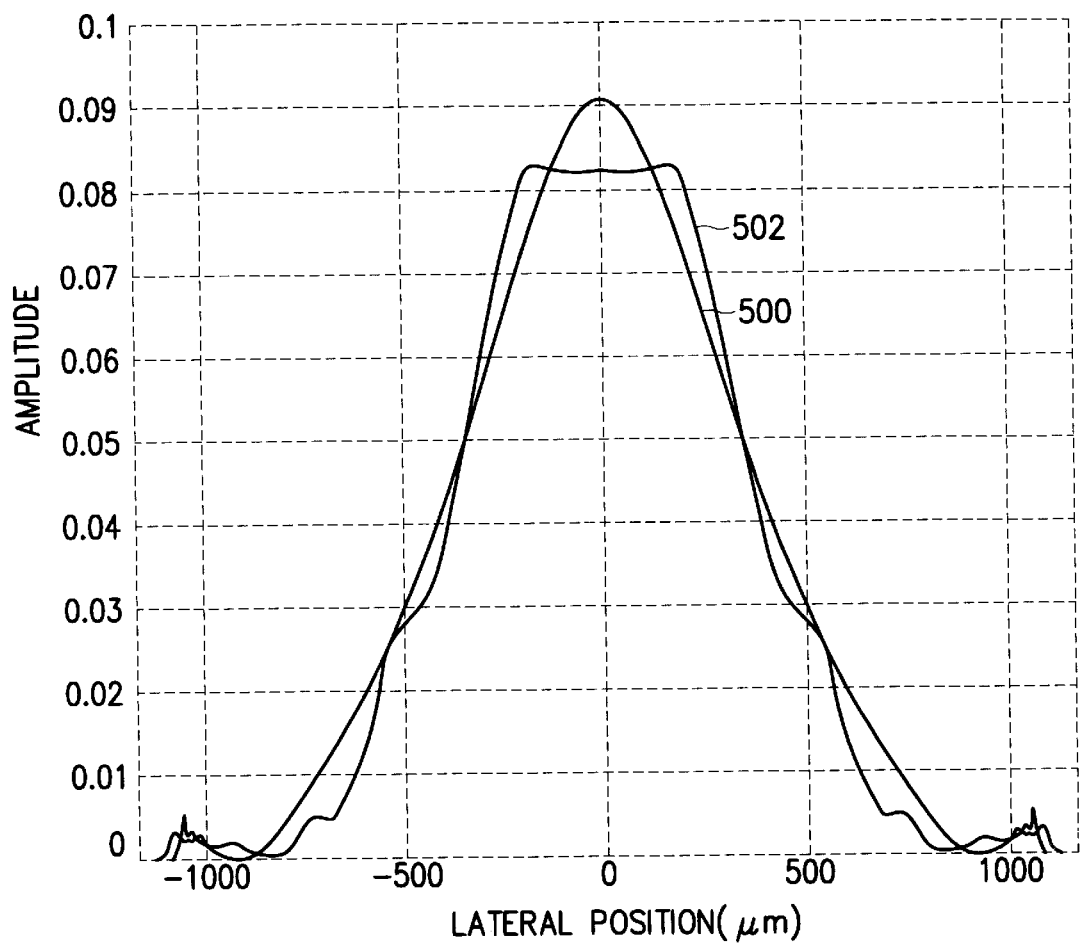
FIG. 5 is a graph for comparing a diffraction pattern formed by the AWG optical wavelength demultiplexer according to the present invention with a diffraction pattern formed by the conventional AWG optical wavelength demultiplexer.

FIG. 5 is a graph for comparing a diffraction pattern formed by the AWG optical wavelength demultiplexer according to the present invention with a diffraction pattern formed by the conventional AWG optical wavelength demultiplexer. In FIG. 5, the reference numeral 500 denotes the diffraction pattern formed in accordance with the conventional method whereas the reference numeral 502 denotes the diffraction pattern formed in accordance with the present invention. Referring to FIG. 4, it can be found that the diffraction pattern according to the present invention is flatter at a lateral position where it is formed, as compared to that of the conventional method.

Figure 6:
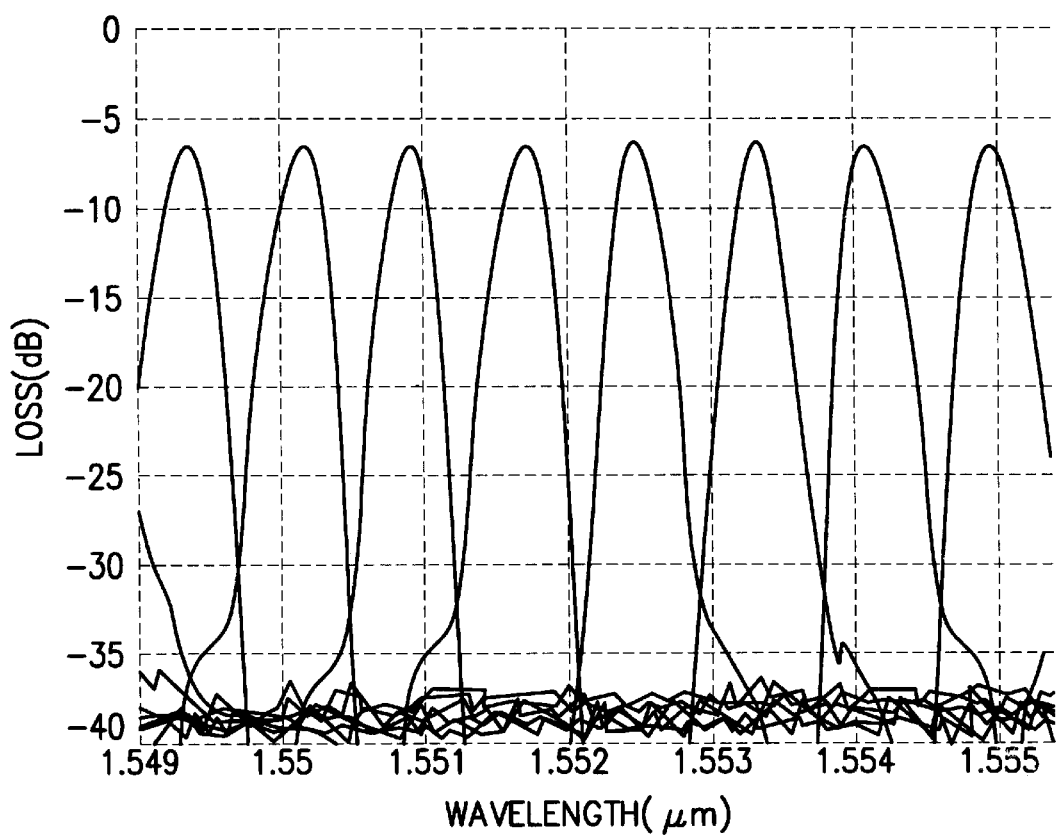
FIG. 6 is a graph depicting output characteristics of the AWG optical wavelength demultiplexer according to the present invention.

FIG. 6 is a graph depicting output characteristics of the AWG optical wavelength demultiplexer according to the present invention. Referring to FIG. 6, it can be found that the output characteristics according to the present invention involve a flatter loss, as compared to that output characteristics shown in FIG. 3.

While the present invention has been described in detail with reference to the specific embodiment, they are mere an exemplary application. Thus, it is to be clearly understood that many variations can be made by anyone skilled in the art within the scope and spirit of the present invention.

As apparent from the above description, the present invention provides an AWG optical wavelength demultiplexer using a waveguide mode controller arranged at the output terminal of an AWG thereof and adapted to control the output waveguide mode of the AWG in such a fashion that it maintains the main peak of the output waveguide mode while phase-shifting the tails of the output waveguide mode. By virtue of the mode controller, it is possible to form a diffraction pattern with flat amplitude characteristics. Accordingly, a uniformity of loss among the channels is obtained. Since the waveguide mode controller is arranged between the AWG and the second star coupler, it does not affect the size of the device. Therefore, there is no problems such as a reduction in production throughout or a difficulty in processing.

What is claimed is:

1. An optical wavelength multiplexer/demultiplexer for coupling or dividing optical signals of different wavelengths received from one or a plurality of input optical waveguides, and outputting the coupled or divided optical signals to a plurality of output optical waveguides, said optical wavelength multiplexer/demultiplexer comprising:

a first star coupler for dividing powers of the optical signals received from the input optical waveguides;

an arrayed waveguide grating for guiding the optical signals outputted from said first star coupler therethrough so that the optical signals have a constant phase difference between adjacent arrayed waveguides;

a second star coupler for one of coupling or dividing the differing wavelengths of resultant optical signals outputted from said arrayed waveguide grating, and outputting the resultant optical signals to said output waveguides, respectively; and waveguide mode control means for controlling the profile of a waveguide mode of the optical signals outputted from said arrayed waveguide grating, thereby allowing the optical signals focused at an output terminal of said second star coupler to have flat amplitude distributions, said waveguide mode control means including a multi-mode coupler substantially maintaining a main peak of the waveguide mode while phase-shifting tails of the waveguide mode.

2. The optical wavelength multiplexer/demultiplexer in accordance with claim 1, wherein the length of said multi-mode couplers is determined by the following equation:

$$L \cong nMW^2/\lambda$$

wherein, "L" represents the length of each said multi-mode coupler, "n" represents a refractive index of the multi-mode coupler, "M" represents the number of mode reconstruction times for an optical signal inputted to the multi-mode coupler, "W" represents the width of said multi-mode coupler, and "l" represents the wavelength of the optical signal, respectively.

3. The optical wavelength multiplexer/demultiplexer in accordance with claim 1, wherein said waveguide mode control means comprises:

a plurality of multi-mode couplers coupled to respective output terminals of waveguides arrays in said arrayed waveguide grating.

4. The optical wavelength multiplexer/demultiplexer in accordance with claim 3, wherein the length of each said multi-mode couplers is determined by the following equation:

$$L \cong nMW^2/\lambda$$

wherein, "L" represents the length of each said multi-mode coupler, "n" represents a refractive index of the multi-mode coupler, "M" represents the number of mode reconstruction times for an optical signal inputted to the multi-mode coupler, "W" represents the width of said multi-mode coupler, and "λ" represents the wavelength of the optical signal, respectively.

* * * * *